(12) United States Patent
Jonischkeit

(10) Patent No.: US 7,591,499 B2
(45) Date of Patent: Sep. 22, 2009

(54) ROLLER BLIND

(75) Inventor: Christoph Jonischkeit, Mühldorf (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 471 days.

(21) Appl. No.: 11/412,711

(22) Filed: Apr. 27, 2006

(65) Prior Publication Data

US 2006/0260767 A1  Nov. 23, 2006

(30) Foreign Application Priority Data

Apr. 28, 2005 (DE) ........................ 10 2005 019 884

(51) Int. Cl.
*B60R 7/06* (2006.01)
(52) U.S. Cl. .................... 296/37.8; 296/24.34
(58) Field of Classification Search ................ 296/37.8, 296/24.34, 153; 220/350; 160/183, 185, 160/188
See application file for complete search history.

(56) References Cited

U.S. PATENT DOCUMENTS

| | | | |
|---|---|---|---|
| 2,064,470 A | 12/1936 | Heckman | |
| 2,573,962 A | 11/1951 | Fox et al. | |
| 3,717,247 A | 2/1973 | Moore | |
| 3,870,391 A | 3/1975 | Nims | |
| 4,157,845 A | 6/1979 | Quéveau | |
| 4,923,244 A | 5/1990 | Clenet | |
| 4,934,750 A | 6/1990 | Eichler et al. | |
| 5,169,699 A | 12/1992 | Prince | |
| 5,752,740 A | 5/1998 | Volkmann | |
| 6,217,112 B1 | 4/2001 | Linsenmeier et al. | |
| 6,231,940 B1 | 5/2001 | Aichner et al. | |
| 6,398,890 B1 | 6/2002 | Spoerle | |
| 6,558,497 B2 | 5/2003 | Franco et al. | |
| 6,845,032 B2 | 1/2005 | Toyoda et al. | |
| 6,953,612 B2 | 10/2005 | Spoerle | |
| 7,087,842 B2 | 8/2006 | Belli et al. | |
| 7,343,956 B2 | 3/2008 | Schleef et al. | |
| 2002/0005424 A1 | 1/2002 | Lange et al. | |
| 2002/0108698 A1 | 8/2002 | Spoerle | |
| 2003/0052129 A1 | 3/2003 | Fukuo | |

(Continued)

FOREIGN PATENT DOCUMENTS

DE    38 07 880 C2    1/1991

(Continued)

OTHER PUBLICATIONS

Search Report from European Application No. 06 01 8781 dated Feb. 16, 2007.

(Continued)

*Primary Examiner*—Joseph D Pape
(74) *Attorney, Agent, or Firm*—Wolf, Greenfield & Sacks, P.C.

(57) ABSTRACT

A roller blind assembly for movably opening and closing the openings of trays, storage spaces, control consoles and other enclosures, in particular for use in a motor vehicle is disclosed. The roller blind assembly includes a guide for guiding the roller blind along a curved displacement path on at least one side edge of the opening, and a plurality of guide elements connected to the roller blind engaging each with the guide. The roller blind portion last covering the opening when closing the roller blind may be detachable from the guide and/or pivotable into the plane defined by the opening.

18 Claims, 4 Drawing Sheets

U.S. PATENT DOCUMENTS

| | | |
|---|---|---|
| 2004/0003890 A1 | 1/2004 | Bauer et al. |
| 2004/0029030 A1 | 2/2004 | Murray |
| 2004/0065456 A1 | 4/2004 | Belli et al. |
| 2004/0118851 A1 | 6/2004 | Shinomiya |
| 2005/0098257 A1 | 5/2005 | Bauer et al. |
| 2005/0194825 A1 | 9/2005 | Kurz et al. |
| 2005/0252317 A1 | 11/2005 | Ueki |
| 2005/0276874 A1 | 12/2005 | Menaldo et al. |
| 2006/0066118 A1 | 3/2006 | Radu et al. |
| 2007/0102463 A1 | 5/2007 | Thomas |

FOREIGN PATENT DOCUMENTS

| | | |
|---|---|---|
| DE | 40 10241 A1 | 4/1991 |
| DE | 42 20 670 A1 | 1/1994 |
| DE | 43 09 620 C2 | 1/1995 |
| DE | 195 24 177 C1 | 8/1996 |
| DE | 196 46 809 A1 | 5/1998 |
| DE | 196 54 246 A1 | 6/1998 |
| DE | 94 03 833 U1 | 3/1999 |
| DE | 19 822 425 C1 | 2/2000 |
| DE | 199 09 642 C1 | 4/2000 |
| DE | 19923512 A1 | 12/2000 |
| DE | 10023778 A1 | 11/2001 |
| DE | 20 2004 006 649 U1 | 10/2004 |
| EP | 1600330 A1 | 11/2005 |

OTHER PUBLICATIONS

Search Report from European Application No. 06008980 dated Aug. 1, 2006.

Search Report from European Application No. 06000477 dated May 12, 2006.

Search Report from European Application No. 66007683.3-2421 dated Aug. 1, 2006.

ROLLER BLIND

BACKGROUND

1. Field

Aspects of the invention relate to a roller blind for opening and closing a tray, storage space, control console and/or other enclosures, in particular for use with enclosures in motor vehicles.

2. Discussion of Related Art

Roller blinds have been used in certain areas of motor vehicles, such as on covers of control elements, storage surfaces and particularly in the area of the center console, which permit movably opening and closing of these enclosures by hand. Because high requirements are placed on the appearance of the interior and in particular on these roller blinds in upper mid-range or top-range motor vehicles, roller blinds must be both functional and aesthetically pleasing.

Such roller blinds generally have a plurality of support elements or slats connected to each other by an elastic or flexible connecting layer in such a way that the support elements engage in a guide along which the roller blind moves. The guide may be located on the sides of the enclosure to be closed. Typically, guides are designed in such a way that a roller blind is guided via a curved displacement path out of the plane defined by the opening of the enclosure, at a point beyond the opening closed by the roller blind. One example of a roller blind for use in an armrest for vehicles is described in DE 195 24 177 C1.

When roller blinds are guided in a substantially curved displacement path out of the plane defined by the opening of the enclosure, the rear part of the opening (i.e., that part which is uncovered last by the roller blind when it is being opened and covered first when the roller blind is being closed) may be lower than the front part of the opening. A lowered area is thus formed in which dirt can accumulate. Furthermore, this lowered section of the roller blind in the rear part of the opening detracts from the appearance of the covered enclosure.

Therefore, it has been attempted to cover this lowered area with a cover in such a way that it is no longer visible from the outside, as described in DE 100 23 778 A1. However, in order to fully cover the lowered area, such a cover must overlap the edge of the opening, thus impeding access to the enclosure. In addition, these types of covers do not prevent soiling and accumulation of smaller dirt or dust particles.

SUMMARY

In one illustrative embodiment, a roller blind assembly for movably opening and closing an enclosure defining an opening in a motor vehicle is provided. The roller blind assembly includes a roller blind with a last roller blind portion, a plurality of guide elements connected to the roller blind, and at least one guide arranged on at least one side edge of the enclosure along a displacement path defining a curvature. The guide engages the plurality of guide elements. At least the last roller blind portion is pivotable into a plane defined by the opening.

In another illustrative embodiment, a roller blind assembly for movably opening and closing an enclosure defining an opening in a motor vehicle is provided. The roller blind assembly includes a roller blind with a last roller blind portion, and at least one guide engaging the roller blind. A means for pivoting the last roller blind portion into a plane defined by the opening is also provided.

In yet another illustrative embodiment, a roller blind assembly for movably opening and closing an enclosure defining an opening in a motor vehicle is included. The roller blind assembly includes a roller blind with a last roller blind portion and a plurality of guide elements connected to the roller blind. The last roller blind portion is associated with a rearmost guide element that is shorter than at least one other guide element. A first curved sliding rail is arranged on one side of the opening and a second curved sliding rail is arranged on an opposite side of the opening. The first and second sliding rails engage the plurality of guide elements. A diversion is connected to the first and/or second sliding rails and configured to pivot at least the last roller blind portion into a plane defined by the opening. The opening has a width and the diversion spans only part of the width of the opening.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

According to one aspect of the invention, a roller blind is provided for movably opening and closing the openings of trays, storage spaces, control consoles and/or other enclosures, in which the roller blind has guide elements that are guided in a guide that directs the roller blind along a curved displacement path. In one embodiment, the guide and guide elements are located at two opposite side edges of the opening. The roller blind is formed such that, during closing, at least the roller blind portion last covering the opening (i.e., the last portion of the roller blind) can be pivoted out of the curved displacement path into the plane defined by the opening.

The plane defined by the opening does not necessarily need to extend straight in its two main directions. Thus, the plane may be defined when the side edges of the opening are formed along a curvature, and thus the roller blind may follow this curvature. The plane defined by the opening may therefore be flat, curved, or any other configuration, as the invention is not limited in this respect.

The last portion of the roller blind can be pivoted in any suitable manner, as the present invention is not limited in this respect. Some examples of pivoting mechanisms include a resilient piece, pneumatic or hydraulic setting elements, or any other arrangement. Any method used to pivot the last portion of the roller blind out of the curved pathway defined by the guide and into the plane defined by the opening may be used, as the invention is not limited in that respect.

In one embodiment, the roller blind is guided by guide elements, for instance guide pins which are connected to the roller blind itself or parts thereof and which engage a guide for the roller blind. The guide elements may be any suitable shape and may be a part of or connected to any portion of the roller blind, as the invention is not limited in these respects.

In another embodiment, a guide is arranged on at least one side of the opening to be closed by the roller blind. In one embodiment, the guide comprises two tracks located at opposite sides of the opening that extend over a substantial portion of the length of the opening. In yet another embodiment, the guide comprises sliding rails arranged at opposite sides of the opening. The sliding rails may permit low-friction displacement of the roller blind with the proper choice of design and materials. Other guides may be used without departing from the scope of the present invention, as the invention is not limited in this respect.

In another embodiment of the invention, the guide has a diversion in the rear area of the opening, which extends into the plane defined by the opening. In another embodiment, the diversion is designed so as to be a part of the sliding rails. In yet another embodiment, the diversion is arranged substantially tangentially to the curvature of the displacement path. The diversion may be in any configuration, as the invention is not limited in this respect, as long as the diversion permits the last portion of the roller blind to move into a substantially coplanar position relative to a substantial portion of the remainder of the roller blind and/or the opening. The diversion may securely pivot at least the last roller blind portion into the desired plane when the enclosure is closed.

In one embodiment, the diversion from the guide is formed so as to cover only a partial width of the guide. In other words, the diversion may be formed so as to be narrower (i.e., take up less of the width of the enclosure) than the guide. A diversion narrower than the guide may permit the roller blind to pivot into the plane defined by the opening in a space-saving manner. However, the diversion may have the same width as the rest of the guide, a separate guide for the last portion of the roller blind may be used, or any other design that permits the last portion of the roller blind to pivot into the plane defined by the opening, as the present invention is not limited in that regard.

In one embodiment, the roller blind has a plurality of successively arranged, substantially rigid support elements which are connected with each other by at least one flexible layer. The support elements are formed so as to span the entire width of the roller blind and are formed in a sufficiently narrow manner so as not to impede, or impede only to a small extent, the displacement of the roller blind along the curved displacement path. The roller blind may include a single flexible support element or have a plurality of support elements attached in some other way, as the present invention is not limited in these respects.

The support elements may be formed of any material. In one embodiment, a substantially stiff plastic may be used having a desired weight, cost, and/or shaping properties. However, other materials such as metals may be used, as the invention is not limited in this regard.

The flexible layer, through which the above-mentioned rigid support elements are connected, may extend over substantially the entire width and the entire length of the roller blind. Any material may be used for the flexible layer as the invention is not limited in this respect. In one embodiment, the flexible layer is formed of a material with desirable elasticity, form stability, light resistance, strength and/or other characteristics.

In one embodiment, each support element of the roller blind extends over the entire width of the opening to be covered and has at least one guide element engaging with the guide. In one embodiment, each support element of the roller blind comprises two guide elements on opposite sides engaging the guide. In one embodiment, at least some of the guide elements comprise guide pins that engage with guide rails. In another embodiment, extensions of the support elements comprise at least some of the guide elements such that the support elements themselves engage with the guides. The guide elements may be any shape, including tabs, blocks, or any other configuration as the invention is not limited in this respect.

In another embodiment, at least the rearmost guide element of the roller blind is designed so as to be shorter (i.e., span less of the width of the opening) than at least one of the remaining guide elements. The length of the last guide element is selected such that it is stably movably mounted in the guide throughout the entire displacement path of the roller blind. A shorter rearmost guide element provides a way to permit only the rearmost guide element to enter into the diversion while all the other guide elements which are designed to be longer are displaced past the diversion and along the curved guide. Other configurations permitting only the rearmost guide element to be directed out of the curved path and into the diversion (such as a smaller or tapered cross-section of the rearmost guide element) may be used as the invention is not limited in this respect.

In another embodiment, a spring aids and/or supports pivoting of at least the last roller blind portion. The spring is arranged and configured to pivot the last roller blind portion into the plane defined by the opening. The spring may be arranged and configured to pivot the last roller blind portion up to a stopper element, e.g. an end portion of the diversion or a cover surrounding the opening in this area. Other aids for pivoting the last roller blind portion may additionally or alternatively be used, as the invention is not limited in this respect.

In another embodiment, the roller blind has a mechanism for blocking the displacement movement. The blocking mechanism may prevent the roller blind from movement irrespective of what position the roller shade is in. In one embodiment, this mechanism also or exclusively acts upon the pivoted roller blind portion such that, when this blocking mechanism is actuated, the last roller blind portion cannot be pivoted out even if a large force is exerted. Other mechanisms for preventing movement of the roller blind or portions of the roller blind may additionally or alternatively be used, as the invention is not limited in this regard.

In another embodiment, the enclosure which can be opened and closed by the roller blind is arranged in an armrest or the center console of a motor vehicle. In another embodiment, the enclosure is used to accommodate a telephone. The enclosure to be closed may be of any size and location, as the invention is not limited in these respects.

The roller blind can include any kind of suitable decorative material. For example, wood, wood veneer, plastic, sheet metal, leather, or leather-like materials may be used on construction of the roller blind. Other decorative materials may additionally or alternatively be used in construction of the roller blind as the invention is not limited in this respect.

In one embodiment, the roller blind has a padding which covers the entire top surface (i.e., the side facing away from the enclosure) of the roller blind. In another embodiment, padding on the roller blind is coated with a leather and/or leather-like material. The roller blind may be aesthetically pleasing, pleasant to touch, and/or useable as a supporting surface for the arms of vehicle occupants. The roller blind may not have padding or may have padding that does not substantially cover the entire roller blind as the invention is not limited in these respects.

In another embodiment, the cover has a plurality of substantially parallel quilting seams which are each arranged substantially perpendicularly to the displacement path of the roller blind. In still another embodiment, quilting seams are arranged between the rigid support elements of a roller blind. The cover of the roller blind may have no seams, a single seam, seams oriented in other directions, seams tacking the support elements together, or seams of any other configuration, as the invention is not limited in this regard.

In another embodiment, the enclosure which can be closed with the roller blind is surrounded entirely by a padding. The padding provides a substantially continuous and padded surface without a lowering in the rear area of the roller blind. This is true in particular when the roller blind itself has a padding and the top side of the roller blind is on the same level as the surrounding padding. The roller blind may be only partially surrounded by padding or have no padding around it at all, as the invention is not limited in this respect.

Figure 1:
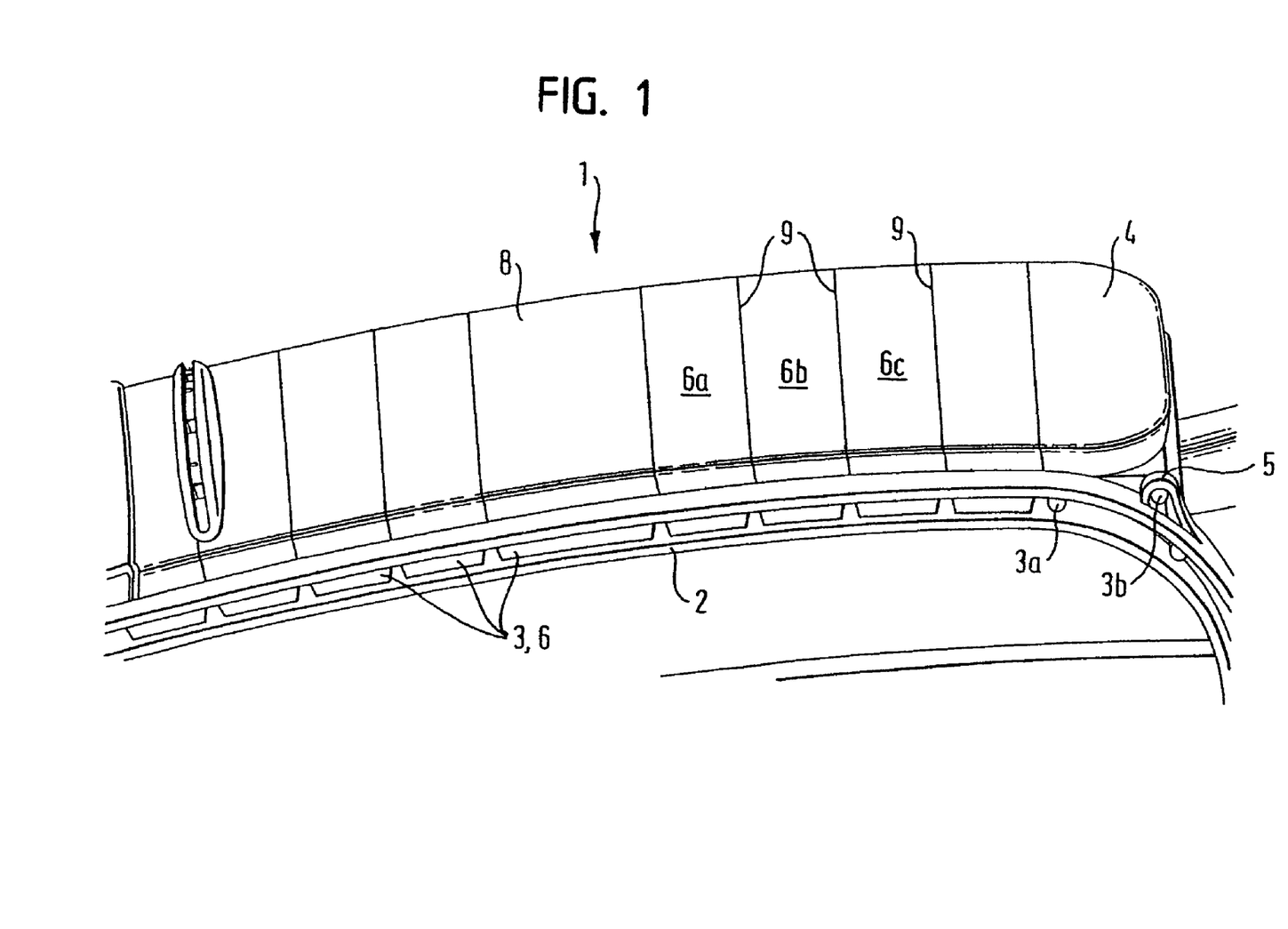
FIG. 1 is a perspective side view of a roller blind according to one embodiment.

Turning now to the illustrative embodiments shown in the figures and in particular to FIG. 1, a roller blind 1 is provided with a padding 8. At the top side thereof, the padding 8 of the roller blind 1 is divided by a plurality of substantially parallel quilting seams 9, each being arranged between adjacent support elements 6a, 6b, 6c. Although the roller blind is shown and described as being padded, the present invention is not limited in this respect, as no padding need be employed. Further, quilting lines may not be employed, as other suitable arrangements for segmenting the roller blind may be used.

At the sides, the support elements 6 continue as guide elements 3 which, in one embodiment, have a width corresponding to that of the respective support elements 6. The last support element of the roller blind 1 (right in FIG. 1) has, however, two guide elements 3a, 3b of different lengths, which are formed to be substantially cylindrical. In one embodiment, the last guide element 3b is formed to be shorter than the preceding guide element 3a. All of the guide elements 3, 3a engage with the guide 2 which is formed as a sliding rail and which, in its rear part (right in FIG. 1), has a radius of curvature which defines a curved displacement path for the roller blind 1. In the curvature area, the guide 2 has a diversion 5 which is arranged substantially tangentially to the curvature of the guide 2. At its end facing away from the sliding rail, the diversion 5 forms a receptacle, the dimensions and arrangement of which are selected such that the last guide element 3b is encompassed in a form-locking manner, and the last roller blind portion 4 is pivoted out of the curved displacement path into the plane defined by the opening.

Figure 2:
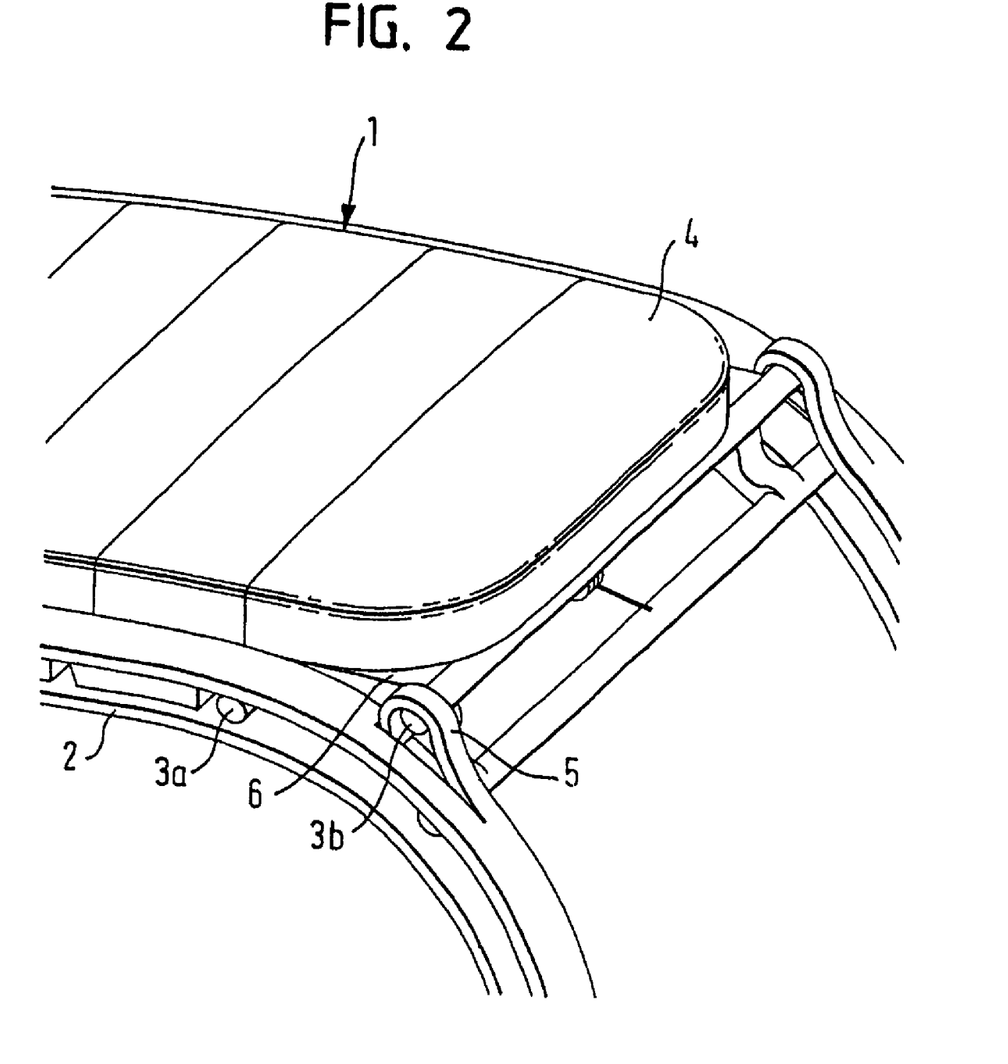
FIG. 2 is a perspective top view of the last portion of the roller blind of FIG. 1 covering an opening.

FIG. 2 is an enlarged partial view of the roller blind 1 shown in FIG. 1. As can be seen, the last support element 6 of the roller blind 1 (right in FIG. 2) has two cylindrical guide elements 3a, 3b, the lengths of which are selected to be different such that the longer, front guide element 3a is displaced along the curved displacement path defined by the sliding rail 2, and the shorter, back guide element 3b moves into the diversion 5. The diversion 5 only protrudes from a partial width of the sliding rail 2.

Figure 3:
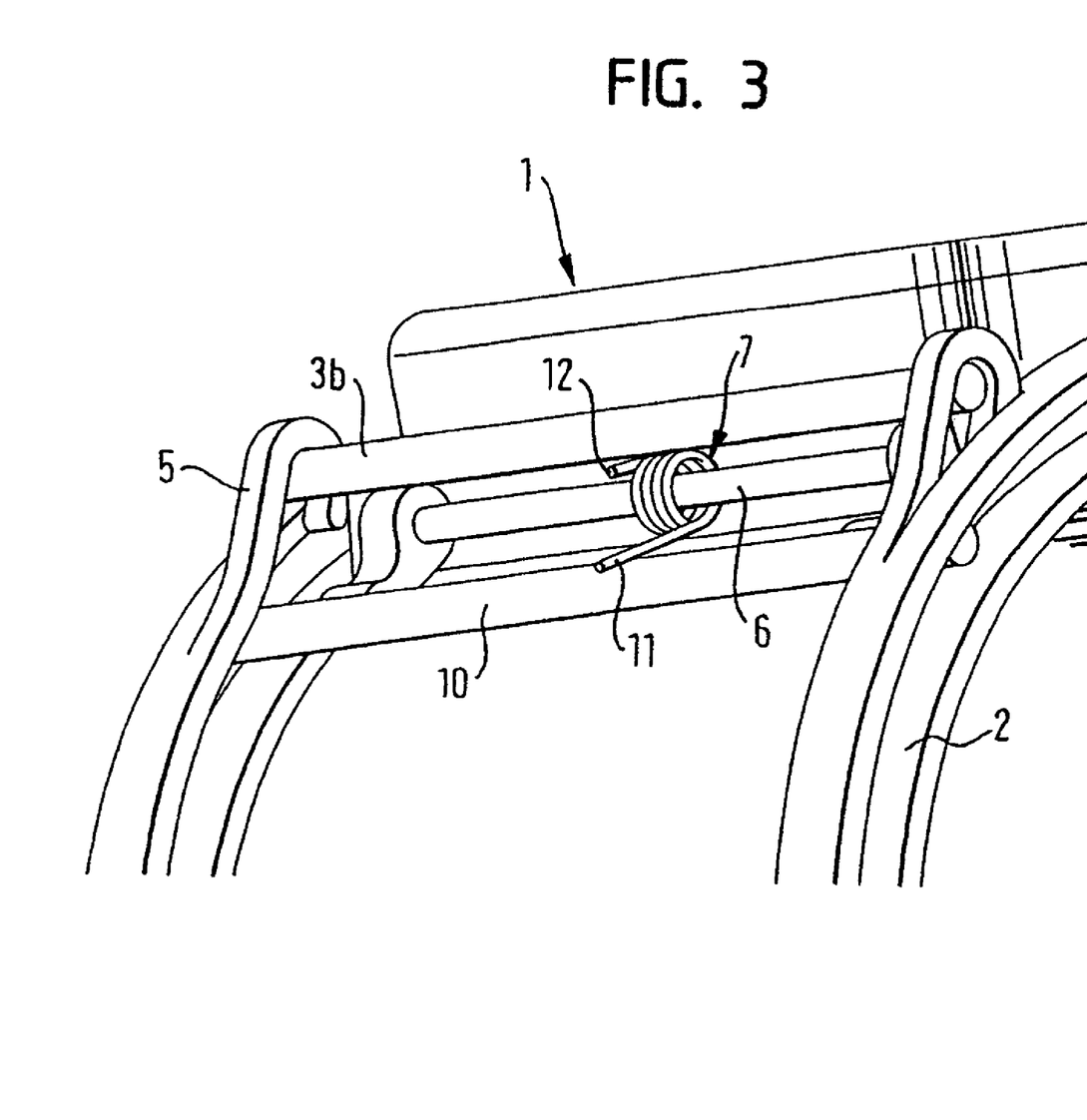
FIG. 3 is a perspective rear view of a roller blind according to another embodiment.

FIG. 3 shows a partial view of a rear part of another embodiment of a roller blind 1 in which, in contrast to the embodiments shown in FIGS. 1 and 2, a biasing arrangement is employed. In one embodiment, as shown, torsion spring 7 supports the pivoting movement of the roller blind portion 4 into the plane defined by the opening and/or roller blind 1. The top leg 12 of the spring 7 presses against the last guide element 3b and forces it into the diversion 5 until reaches the stopper element. As a counter bearing or support for the spring 7, the bottom leg 11 of the spring 7 rests on a guide pin 10. The guide pin 10 is pivotably connected to the support element 6 of the roller blind portion 4, and moves along the curvature of the sliding rail 2. As can clearly be seen from FIG. 3, the diversion 5 is formed in such a way that, to open the roller blind 1, the compressive force of the spring 7 comprises a substantial part of the force that must be overcome in order to force the last roller blind portion 4 out of the plane of the opening and into the curvature direction of the sliding rail 2. The orientation of the diversion 5 is designed in such a manner that the opening movement of the roller blind 1 is not significantly impeded.

Figure 4:
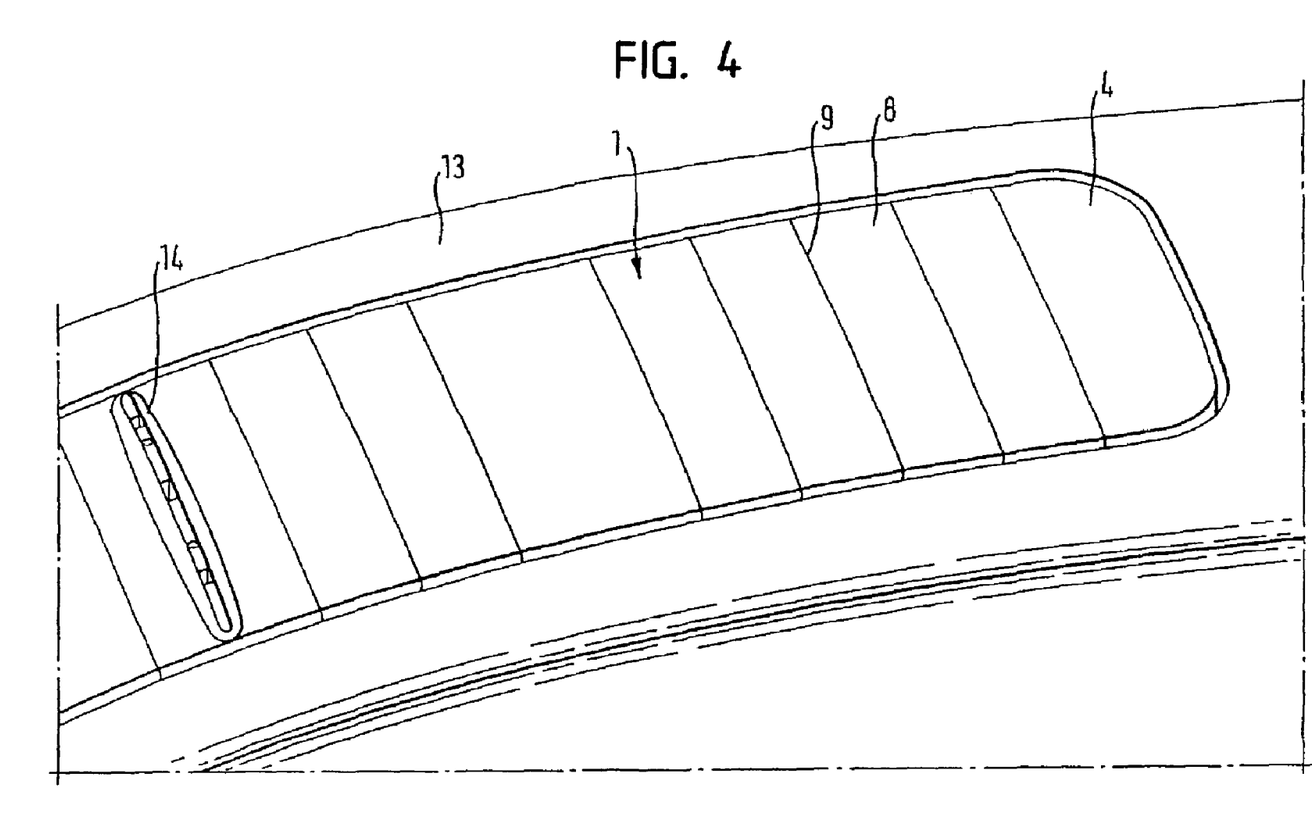
FIG. 4 is a perspective view of a central armrest with a roller blind according to yet another embodiment.

FIG. 4 shows a perspective top view of a padded central armrest 13 in which a roller blind 1 is mounted, with the padding 8 being divided by substantially parallel quilting seams 9. At the front end of the roller blind (left in FIG. 4), the roller blind 1 additionally has a handle 14. The handle may provide a release to permit the roller blind to move. The handle 13 may have a curved displacement path substantially perpendicular to the plane defined by the top side of the central armrest 13, which is slightly curved in the embodiment depicted in FIG. 4. In the closed state, the entire roller blind 1, including the rearmost roller blind portion, is pivoted into the plane defined by the central armrest 13. Thus, there are no lowerings in the entire central armrest, inhibiting accumulation of dirt particles and providing a continuous arm support surface. The padding 8 of the roller blind 1 may be arranged at the same level as the padding of the central armrest 13 by which it is surrounded.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the foregoing description and drawings are by way of example only.

What is claimed is:

1. A roller blind assembly for movably opening and closing an enclosure defining an opening in a motor vehicle, the roller blind assembly comprising:
   a roller blind with a last roller blind portion;
   a plurality of guide elements connected to the roller blind, wherein the last roller blind portion is associated with a rearmost guide element, and at least the rearmost guide element of the roller blind is shorter than at least one other guide element; and
   at least one guide arranged on at least one side of the enclosure along a displacement path defining a curvature, wherein the guide engages the plurality of guide elements and wherein at least the last roller blind portion is pivotable into a plane defined by the opening, the opening having a rear area, and the guide comprises a diversion in the rear area of the opening extending into the plane defined by the opening.

2. The roller blind assembly according to claim 1, wherein the opening has opposite sides and the at least one guide comprises a first sliding rail arranged at one side of the opening and a second sliding rail arranged at an opposite side of the opening.

3. The roller blind assembly according to claim 1, wherein the diversion is arranged substantially tangentially to the curvature of the displacement path.

4. The roller blind assembly according to claim 1, wherein the opening has a width, and the diversion spans only part of the width of the opening.

5. The roller blind assembly according to claim 1, wherein the roller blind comprises a plurality of successively arranged, substantially rigid support elements connected by at least one substantially flexible layer.

6. The roller blind assembly according to claim 5, wherein each support element has at least one guide element on a side facing the guide.

7. The roller blind assembly according to claim 1, further comprising a spring arranged and configured to cause and/or support pivoting the last roller blind portion.

8. The roller blind assembly according to claim 1, wherein the roller blind has a mechanism for blocking displacement.

9. The roller blind assembly according to claim 1 in combination with the motor vehicle, the motor vehicle having at least one of an armrest and a center console, wherein the enclosure is arranged in the at least one of the armrest and the center console of the motor vehicle.

10. The roller blind assembly according to claim 1, further comprising a padding, wherein the roller blind has a top side facing away from the enclosure and the padding preferably covers the top side of the roller blind.

11. The roller blind assembly according to claim 10, wherein the padding is covered with a leather and/or leather-like material.

12. The roller blind assembly according to claim 5, wherein the roller blind has a plurality of substantially parallel quilting seams between the rigid support elements.

13. The roller blind assembly according to claim 1 in combination with the motor vehicle, wherein the opening is substantially surrounded by padding.

14. The roller blind assembly according to claim 13, wherein the roller blind has a top side facing away from the enclosure, and the top side of the roller blind is on the same level as the surrounding padding.

15. The roller blind assembly according to claim 1, wherein the enclosure is sized and configured to accommodate a telephone.

16. A roller blind assembly for movably opening and closing an enclosure defining an opening in a motor vehicle, the roller blind assembly comprising:

a roller blind with a last roller blind portion;

at least one guide engaging the roller blind, wherein the last roller blind portion is associated with a rearmost guide element, and at least the rearmost guide element of the roller blind is shorter than at least one other guide element; and means for pivoting the last roller blind portion into a plane defined by the opening, wherein the means for pivoting comprises the opening having a rear area, and at least one guide comprising a diversion in the rear area of the opening extending into the plane defined by the opening.

17. The roller blind assembly according to claim 16, further comprising a rail engaging the at least one guide element, the rail being constructed and arranged to allow sliding motion of the roller blind along a path defined by the rail.

18. The roller blind assembly according to claim 17, wherein the means for pivoting the last roller blind portion into a plane defined by the opening comprises means to move the last roller blind portion out of the path defined by the rail.

* * * * *

UNITED STATES PATENT AND TRADEMARK OFFICE
CERTIFICATE OF CORRECTION

PATENT NO.       : 7,591,499 B2
APPLICATION NO. : 11/412711
DATED            : September 22, 2009
INVENTOR(S)      : Christoph Jonischkeit It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this

Twenty-first Day of September, 2010

David J. Kappos
*Director of the United States Patent and Trademark Office*